US008363345B2

(12) United States Patent
Mojica

(10) Patent No.: US 8,363,345 B2
(45) Date of Patent: Jan. 29, 2013

(54) APPARATUS, SYSTEM, AND METHOD FOR AUTOMATIC UNTHREAD AND STORE OF DATA STORAGE DEVICE MEDIUM

(75) Inventor: Arturo Avila Mojica, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/247,967

(22) Filed: Oct. 8, 2008

(65) Prior Publication Data

US 2010/0085656 A1   Apr. 8, 2010

(51) Int. Cl.
*G11B 15/18* (2006.01)
*G11B 17/00* (2006.01)
*G11B 5/02* (2006.01)

(52) U.S. Cl. ............................ 360/69; 360/55; 360/71
(58) Field of Classification Search .................. None
See application file for complete search history.

(56) References Cited

U.S. PATENT DOCUMENTS

| | | | |
|---|---|---|---|
| 3,852,814 | A | 12/1974 | Johnson et al. |
| 6,268,975 | B1 | 7/2001 | Bickers |
| 6,424,788 | B1 * | 7/2002 | Jang ................ 386/46 |
| 2005/0052772 | A1 * | 3/2005 | Barbian et al. .......... 360/69 |
| 2009/0002877 | A1 * | 1/2009 | Dunphy ............. 360/77.12 |
| 2010/0020662 | A1 * | 1/2010 | Bayang et al. .......... 369/53.41 |

OTHER PUBLICATIONS

Bernd Reiner et al., Smart Hierarchical Storage Support for Large-Scale Multidimensional Array Database Management Systems, Sep. 15, 2008, http://72.14.235.104/search?q=cache:PagDCbhcrWAJ:www.wibas. forwiss.tu-muenchen.de/wibas/bd/web.
Costas Georgiadis et al., Fundamentals of Scheduling and Performance of Video Tape Libraries, Multimedia Tools and Applications Journal 18(2), Feb. 15, 2002.
Darin Nikolow et al., Gray Box Based Data Access Time Estimation for Tertiary Storage in Grid Environment, PPAM 2003, LNCS 3019.
Administrator's Reference, Sep. 15, 2008, http://publib.boulder.ibm.com/tividd/td/TSM390N/GC32-0776/en_US/HTML/anrmr29.
Wim Feyants et al, Tape Automation with IBM @server xSeries Servers, ibm.com/redbooks.

* cited by examiner

*Primary Examiner* — Andrew L Sniezek
(74) *Attorney, Agent, or Firm* — Kunzler Law Group, PC

(57) ABSTRACT

An apparatus, system, and method for automatic unthreading and storage of storage media helps prevent damage to the media, which can otherwise occur when the storage media is left threaded in a storage media drive over an extended period or under adverse conditions. A sensing device may generate a signal or a detector may receive a signal indicating that a predetermined period of time has lapsed or that some other criteria has been met indicating that the storage media should be removed from the storage media drive. An unthread module in the storage media drive receives the signal and automatically unthreads and stores the storage media. A location on the storage media can be marked by the unthread module prior to unthreading such that the media may be returned to the location upon rethreading.

19 Claims, 3 Drawing Sheets

ID for a device medium.

APPARATUS, SYSTEM, AND METHOD FOR AUTOMATIC UNTHREAD AND STORE OF DATA STORAGE DEVICE MEDIUM

FIELD

This invention relates generally to tape media, tape media drives, and loading and unloading of tape media, and more specifically to automatically initiating an unthread operation after a predetermined time out or other detected parameter threshold.

BACKGROUND

Tape media are loaded for reading and writing to and from the tape media such as for long-term storage and retrieval of data from a host. After loading the tape media and after reading and/or writing data to and/or from the tape media, the tape media may remain in the tape drive for a period of time.

Typically, mounting a tape cartridge in single tape devices, such as drives, stresses the tapes through tension and/or physical contact. This in turn affects the stability and reliability of the tapes. A normal periodic load may be, for example, at the end of business hours for a nightly backup of data. The unload may not occur until morning. Some systems utilize an external application in the form of a Tivoli Storage Manager (TSM) to automatically unload the tape media from a drive after a predetermined time, but these systems are deficient in how they achieve such an unthread operation. For example, performing an unload operation solely by an external application has drawbacks. As an external host or application, the TSM is adapted for interfacing with a wide variety of applications utilizing a wide variety of storage media. Thus, one of the drawbacks of the TSM is a lack of access by users to the application in the event of a failure of the application. Also, any parameters with which the TSM is configured are selected to be as universal as possible and would not apply to specific tape storage media being handled in the tape drive of a particular system. Hence, the TSM would likely not be configured for the correct amount of waiting time before an unthread operation in a particular media drive and/or for a particular medium. Therefore, although TSM applications may prolong the life and reliability of the tape media, they suffer from these and other drawbacks.

SUMMARY

From the foregoing discussion, it should be apparent that a need exists for an apparatus, system, and method that detects when a storage medium has been present on the storage media drive for too long and automatically initiates an unthread and store operation from within the storage media drive. That is, in one embodiment, an apparatus, system, and method for automatically initiating an unthread and store operation would determine a period of time that the storage media can stay in the drive without damage to the storage media. Advantageously, the determination of the need for an unthread operation can be achieved within the storage media drive itself. Thresholds in the other parameters that may be specific to the material, age, usage levels, and other criteria may be set based on a particular storage media to be stored.

The embodiments described herein have been developed in response to the present state of the art, and in particular, in response to the problems and needs in the art that have not yet been fully solved by currently available data storage devices and associated systems. These systems have not been developed to adequately preserve the storage media by automatically causing it to be unthreaded and stored. Accordingly, at least some of the embodiments described herein have been developed to provide an apparatus, system, and method for unthreading storage media before damage to the media occurs.

In a simple form, some embodiments of the invention include a system for unthreading a storage medium after a predetermined time out. The system may include an electronic storage media drive configured to be threaded with a storage medium selected from a plurality of storage media. As such, the system may include a media library comprising the plurality of storage media. The plurality of storage media are stored in the media library in an unthreaded condition and configured to be selectively threaded into the electronic storage media drive. The system includes a storage media drive unthread module in the electronic storage media drive configured to unthread the storage medium from the electronic storage media drive and store the storage medium in the media library in response to detection of a signal. The signal represents at least one of time lapsed, environmental parameters, media parameters, and media usage data.

The system may include memory for buffer data storage. The storage media drive unthread module may be configured to initiate a save and a buffer data flush before unthreading the storage medium.

In one embodiment the system includes a data backup restore application outside of the electronic storage media drive. One example of such a backup restore application is Tivoli Storage Manager (TSM) application. The TSM includes an additional storage manager unthread module that is configured to unthread the medium after a predetermined lapse of time or upon detection of another parameter threshold.

In another simple form, embodiments of the invention include a tape media drive for performing read/write operations on a tape medium. The tape media drive includes a signal generator module that may be configured to detect an operating condition of at least one of the tape media drive and tape medium. The signal generator is configured to generate a signal if the operating condition has exceeded a predetermined threshold. The tape media drive also includes a tape unthread module communicable in signal receiving communication with the signal generator. The tape unthread module is configured to unthread a tape medium threaded on the tape media drive in response to a signal received from the signal generator module. The operating condition may include a length of time after a read/write operation on the tape medium. The signal generator module is configured to generate a signal if the length of time after a read/write operation exceeds a predetermined timeout threshold.

In another simple form, embodiments of the invention include an apparatus for unthreading a storage medium after a predetermined time out or detection of some other pertinent parameter value. The apparatus may include a tape media drive adapted for receipt of a threaded tape medium. The apparatus includes an unthread module in the tape media drive. The unthread module is configured to unthread the tape medium after a lapse of a predetermined period of time or upon detection of a predetermined threshold of another pertinent parameter.

The apparatus may include a detector in the tape media drive. The detector is configured to detect a signal indicating that the tape medium is to be unthreaded. The signal is generated upon the lapse of the predetermined period of time or detection of another parameter threshold. Detection of the signal may occur in the unthread module, and the tape medium may be automatically unthreaded.

In another simple form, embodiments of the present invention include a media drive mechanism. The media drive mechanism may include a reading head for reading storage media and a storage media loading and unloading mechanism for loading and unloading the storage media. The media drive mechanism includes an electronic control module having machine readable code configured to detect a signal of at least one of a predetermined media parameter, environmental parameter, predetermined usage parameter, and a predetermined lapse of time parameter. The electronic control module is configured to unload a storage medium when the signal is detected.

The media drive mechanism may include a user input module configured to enable a user to enter a selected one of the predetermined parameters. The user input module may further include a user interface in which the user interface enables a user to enter the predetermined time or other parameter.

In another simple form, embodiments of the present invention include a method of preserving storage media. The method includes receiving a signal in a media drive indicating that a media is loaded in the media drive at a time when it is not being utilized. The method also includes actuating an unload operation from within the media drive to remove the media from the media drive. The signal may be generated from within the media drive or from outside the media drive.

The signal is a representation of a lapse of a predetermined period of time, predetermined media parameter, predetermined environmental parameter, or usage data. The operation of actuating includes unloading a storage medium when the media or other parameter indicates that damage to the storage medium is likely to occur if the storage medium is left in a loaded condition.

In another simple form, embodiments of the present invention include an article of manufacture having a computer program storage medium readable by a processor and embodying one or more instructions executable by a processor to perform a method for detecting a signal indicating that a storage medium is loaded and is not in use in a storage media drive. The article is configured to perform the method including detecting by a detection module, at least one of a time elapsed and a condition indicating that the storage medium needs to be unloaded from the media drive. The method to be performed by the article of manufacture includes unloading the storage medium under control of a storage media unload module in a storage media drive when the lapse of time or the condition is detected by the detection module.

The article of manufacture is configured to perform the method, which may include undertaking one or more operations by a close out module. The close out operations may include one or more of closing out active processing in the storage media drive, updating data bases used for backup and restore control, and marking a location on the media at which a head of the driver last operated on the media.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. The embodiments described herein may also be combined in any manner. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of embodiments briefly described above will be rendered by reference to specific embodiments that are illustrated in the appended drawings. Understanding that these drawings depict only typical embodiments and are not therefore to be considered to be limiting of its scope, embodiments will be described and explained with additional specificity and detail through the use of the accompanying drawings, in which.

DETAILED DESCRIPTION

Figure 1:
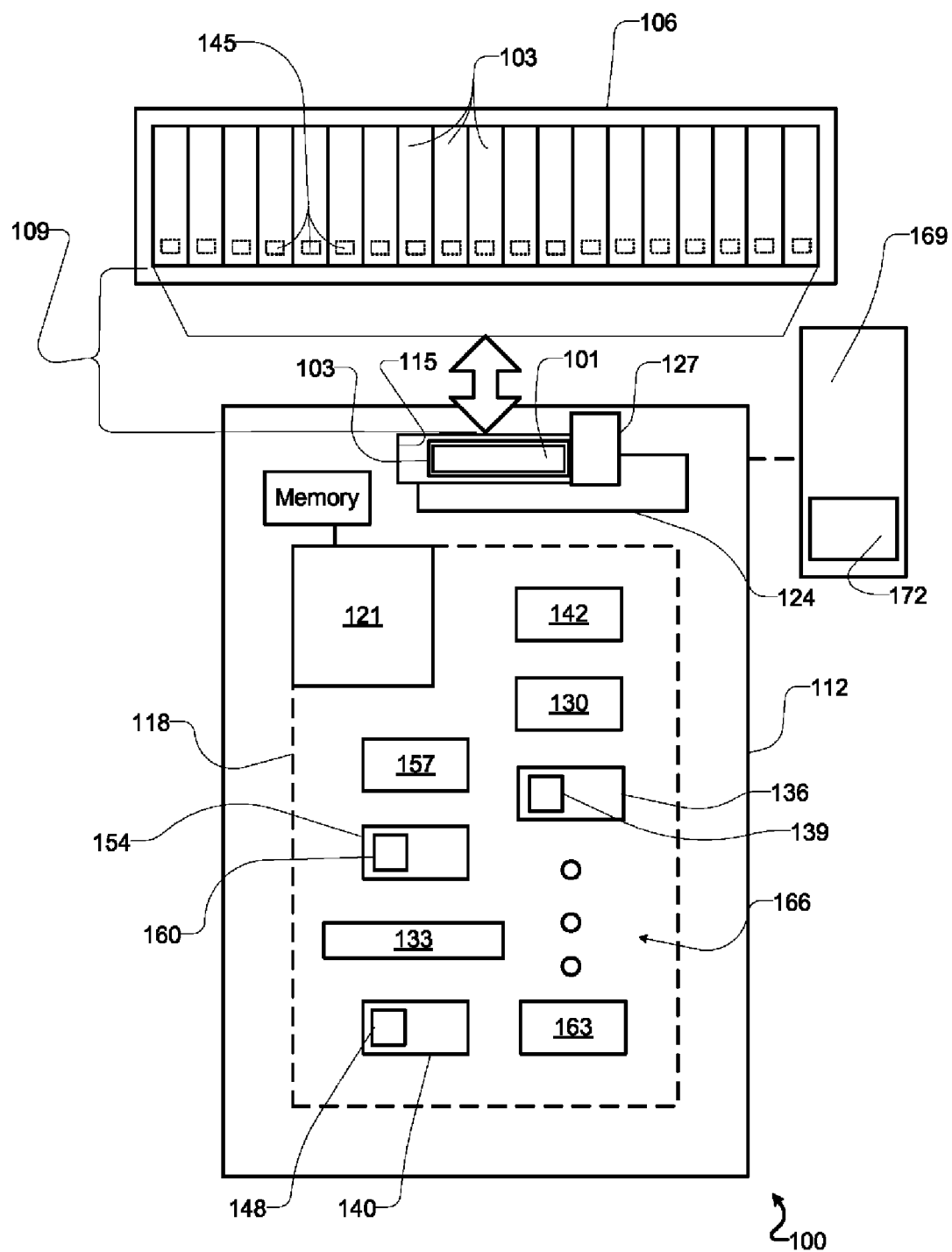
FIG. 1 is a schematic block diagram illustrating one embodiment of a system for protecting a medium that is loaded in a media drive.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only an example of the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram of a system 100 for storing electronic or digital data and protecting a data storage media. In particular, the system 100 is directed to a tape storage media 101 that can be stored in cartridges 103. The cartridges 103 can be stored in a library 106 accessed by a loader module 109 configured to retrieve the cartridges 103 from the library 106, transport them to an electronic storage media drive or tape drive 112, and return them after use. Generally, the tape drive 112 is a data transfer device for receiving data from a host, manipulating that data as needed, and writing it to the tape storage media 101 on the cartridges 103. Additionally or alternatively, the data is read from the tape storage media 101 and transferred to a host. Thus, the loader module 109 selectively moves the cartridges 103 to and from the library 106 into a cartridge slot 115 in the drive 112. The movement of the cartridges 103 may be accomplished automatically in accordance with machine readable instructions processed under the control of an electronic control module 118 (e.g., electronic controller), which includes a processor 121. Although the illustrated embodiment includes a single drive 112 and library 106, in other embodiments, the system 100 may include plural drives 112 and plural libraries 106 without limitation.

The cartridges 103 and tape storage media 101 are regularly stored in a protected condition within the library 106. When retrieved from the library 106, the cartridge 103 and tape storage media 101 are under physical stress and/or exposed to less favorable environmental conditions than those in the library. Retrieval from the library includes 106 the time when the cartridge 103 and tape storage media 101 are loaded into the drive 112. Loading of the tape storage media 101 into the drive includes removing the tape media from the cartridges 103 and threading it onto a take-up spool (not shown) within the drive 112. Thus, the tape media 101 can be stressed and exposed to wear and less protected environmental conditions during retrieval and loading. Leaving a cartridge 103 and the tape media 101 in the drive for extended periods of non-use may increase the stress on the media as well as prolong the media's exposure to stress and/or negative environmental effects. In conventional tape drive systems, the tape can be left in a drive for long periods of time, such as several minutes, hours, or days, in excess of the time needed for a read or write operation.

Part of the wear and negative environmental effects on the media 101 are caused by regular operation of a servo module 124, which controls movement of the tape media 101 between a supply spool in the cartridge 103 and a take-up spool in the drive 112. The media 101 also undergoes wear during reading/writing operations. The servo module 124 controls the speed of the tape storage media 101 during threading and unthreading, and during reading and writing operations. In particular, the servo module 124 accelerates the tape storage media 101 to an appropriate speed at which the target data may be transferred between a buffer 133 and the tape media 101 through the head 127. To perform the data transfer, the servo module 124 interacts with a channel module 130, which sets up a read or write operation. The channel module 130 includes a head module and electronics for controlling transfer of data to and from the tape storage media 101. The channel module 130 thus conducts the physical transfer of data bits to and from the tape storage media 101.

Once a read or write operation is completed, a storage media unthread module 136 can automatically unthread the tape storage media 101 from the take-up spool in the drive 112. The tape storage media is then unthreaded back onto the supply spool within the cartridge 103 from which it was originally threaded. This unthread operation is undertaken while the tape storage media 101 and cartridge 103 remain in the slot 115 in the drive 112. After the tape storage media 101 is unthreaded and placed back in the cartridge 103, it is ready for return to the storage media library 106. The storage media unthread module 136 may also be configured to perform other close out operations, such as stopping active processes, updating databases, and writing an end of data (EOD) to mark the location on the tape 101 at which a read or write operation was most recently performed. Thus, the storage media unthread module 136 may be termed a close out module or may have a separate close out module associated with the unthread module 136.

The storage media unthread module 136 may be configured to analyze one or more parameters and/or detect a parameter threshold at which the unthread module 136 automatically performs the close out operations. The unthread module may include a detector or detector module 139 for detecting a level of a predetermined parameter.

For example, the detector module 139 may include a timer that detects a lapse in time after a read or write operation occurs in the drive 112. Settings in the unthread module 136 can be adjusted through an input module 140 such that the electronic control module 118 is automatically actuated when the timer registers a signal representing a predetermined time threshold.

The detector module 139 can detect other parameter thresholds instead of or in addition to a predetermined time. For example, parameter thresholds may include operational data thresholds, such as the number of times a tape 101 and/or cartridge 103 have been retrieved from the library 106. Alternatively or additionally, the detector module 139 may detect storage media parametric data thresholds, such as thresholds associated with predetermined levels in the physical characteristics of the tape 101 and/or cartridges 103 being retrieved, the amount of stress or strain on the media and/or cartridges, and measurable effects of wear or environment on data stored on the storage media. Thus, the unthread module 136 may automatically initiate an unthread operation when any of a variety of parametric criteria are met. In this way, the tape drive 112 itself can more effectively preserve tape storage media 101 and cartridges 103 over time and use.

In one embodiment, a cartridge memory (CM) reader/writer module 142 is configured to read data from and/or update data on a memory chip or module 145 separate from the tape storage medium 101 of the cartridges 103. For example, tapes with LTO and 3592 formats have memory 145 installed in the cartridge as schematically depicted in dashed lines in FIG. 1. The data in memory 145 is capable of storing parametric data that can be used to determine if parametric threshold(s) have been met. The parametric data in memory 145 may include information indicating valid regions on the tape 101 for information regarding the servo position/conditions, tape storage media data, and EOD information. The parametric data in the memory 145 may also include data on usage statistics of the storage media 101 or cartridge 103. Thus, in one embodiment, the CM reader/writer module 142 interacts with the unthread module 136 under control of the electronic control module 118 to supply threshold data to the unthread module 136 for determining whether an unthread or other close out operation should be initiated.

In one embodiment, the electronic control module 118 includes an input module 140 with a user interface 148, such as a keypad and/or a screen, for inputting the threshold(s) and/or other parameters for operation. Thus, a user can select a predetermined time period or other condition, which when met, generates a signal that initiates an unthread and/or other close out operation.

Once the loader module 109 has loaded a cartridge 103 into the drive 112, the servo module 124 has threaded the tape 101, and accelerated it to the proper speed for reading or writing, then a data flow module 154 reads data from the tape storage media 101. The data flow module 154 also writes to the tape storage media 101 from a host application, for example. The data flow module 154 initially reads data from the tape storage media 101 to prime the buffer 133 or buffers with data and prepare the system for a request for data from a host application. The reading and/or writing are then implemented under control of the electronic control module 118 including the processor 121.

In one aspect, a host interface module 157 in the drive 112 communicates with a host and requests host application backup data be sent from the host to the drive 112. The host application backup data is received, formatted, and sent to buffer 133, for example, by the data flow module 154. The data flow module 154 may include a formatter module 160 configured to perform formatting operations on the data. The data flow module 154 transfers host application backup data to and from the tape storage media 101, and to and from the host through the host interface module 157.

The data flow module 154 receives the data from the host and formats it with error correction codes and other meta-data to make the data compliant with the format of the tape storage media 101. The data flow module 154 places the data into the buffer 133 until the tape reaches the appropriate speed for writing the data to the tape storage media 101. Once the appropriate speed for the tape is reached, the processor and the modules associated therewith, including the channel module 130, operate to transfer the data onto the tape storage media 101.

In another aspect, the processor and its associated modules also causes a read back channel that is downstream from the write channel to read the data back for the benefit of ensuring that it can be read back without error. When the buffer is emptied, it requires the tape to be stopped and repositioned in order to keep writing from the point at which it left off when the buffer became empty. However, since the tape reposition is slow compared to the rate at which data arrives into the buffer, the buffer will continue to fill. The electronic controller 118 is configured to restart the tape 101 when a predetermined buffer full threshold is achieved and detected.

In accordance with another embodiment, when the buffer full threshold is not met, the electronic controller 118 is configured to automatically start the tape, operate the channel module 130, and write any cached data from the buffer 133 onto the tape storage media 101. This may be initiated a predetermined period of time after the tape has been stopped due to an empty buffer, or whenever the tape storage media 101 is to be unloaded.

As may be appreciated, reading the data from the tape storage media 101 for download to a host is substantially a reversal of the process of writing from the host to the tape storage media 101. That is, the data is read from the medium of the storage media 101, extracted from the raw medium format, and prepared to send back to the host by the data flow module 154 and the host interface module 157.

Any number of other modules 163 in addition to or in place of the modules described herein may be provided, as indicated by the ellipses 166. Such modules may be configured to provide additional or substitute functionality without limitation.

In one embodiment, the system 100 includes a Tivoli Storage Manager (TSM) 169 or other data backup/restore application. The TSM 169 is an external or host application that is adapted for interfacing with a wide variety of applications utilizing a wide variety of storage media, which is therefore deficient for many applications having specific drives and/or media. On the other hand, some of the functionality of the TSM 169 application enhances or complements the rest of the system 100 when combined therewith. For example, the TSM may have an additional storage media unthread module 172 that functions in conjunction with the TSM 169 to provide a timed out unthread operation in addition to the unthread operation performed by the unthread module 136 that resides in the drive 112, as described above.

It is to be understood that the timer (when the detector module includes the timer), or the detector module 139 in general, can be provided in other modules or separate from the other modules. In one embodiment, for example, the timer may be provided by a timer in a TSM or other data backup/restore application. The detector module 139 may be operatively connected with the electronic control module 118 to provide the data and/or a signal to the unthread module 136 when the parametric threshold has been reached.

Figure 2:
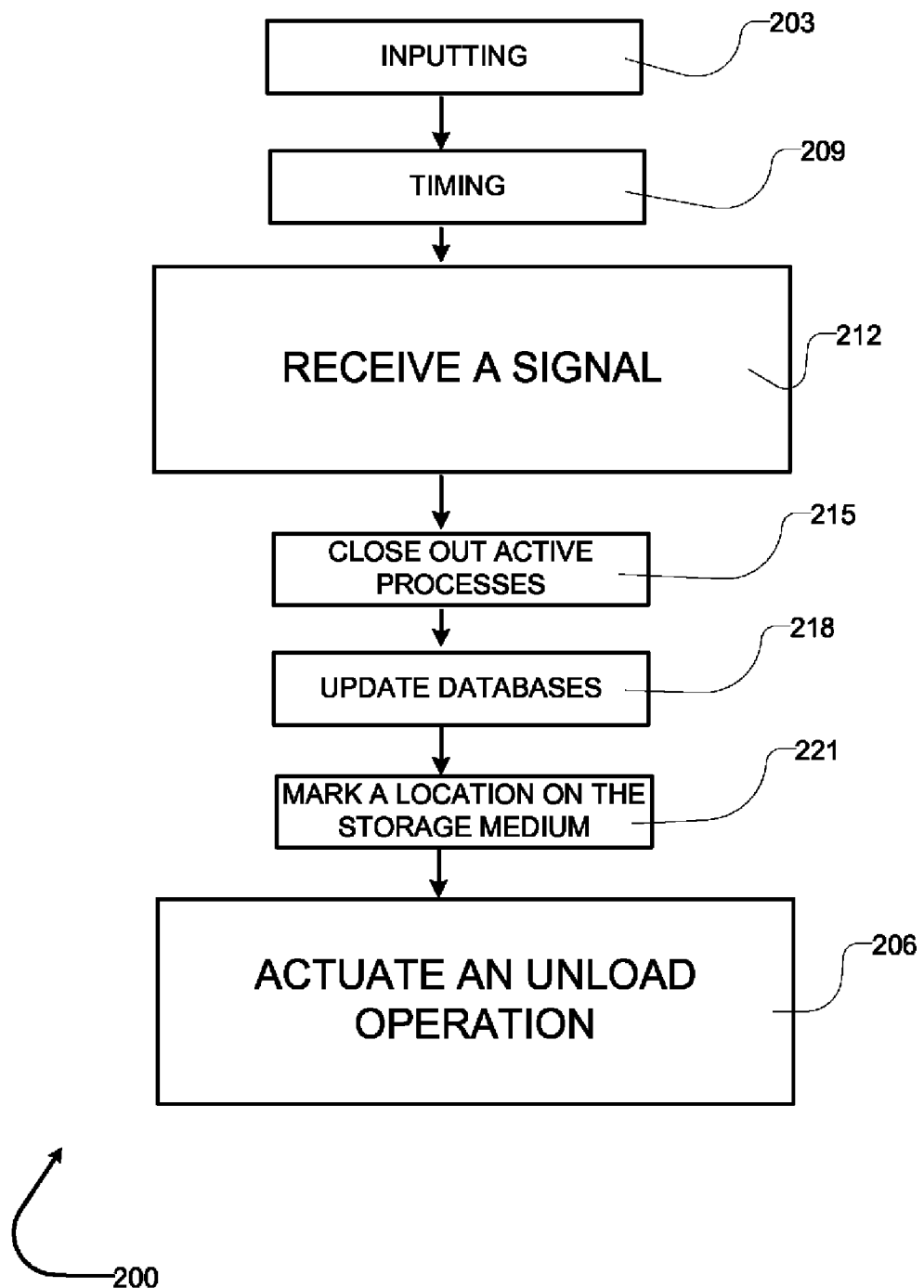
FIG. 2 is block diagram of a method for protecting a medium loaded in a media drive.

FIG. 2 is a diagrammatic flow diagram showing one embodiment of a method 200 for preserving storage media. The method includes inputting 203 a predetermined parametric threshold representing a criterion for actuating 206 an unload or unthread operation. The parametric threshold may be a predetermined lapse in time and the method may include timing 209 a lapse in time after a read or write operation ends in a storage media drive. The method 200 may include receiving 212 a signal indicating that the threshold has been met or surpassed. Receiving 212 the signal may include generating, detecting, and/or receiving 212 the signal in the storage media drive. Actuating 206 the unload operation may include generating the unload operation from within the storage media drive. Actuating the unload operation may include one or more preliminary operations including closing out 215 active processes in the storage media drive, updating 218 databases associated with the drive or its host applications, and marking 221 a location on the storage media for subsequent return when the storage media is reloaded. Marking 221 may be achieved by writing an EOD (or writing a similar signal based on data read from a CM of the storage media) to the storage media for detection upon reload.

Figure 3:
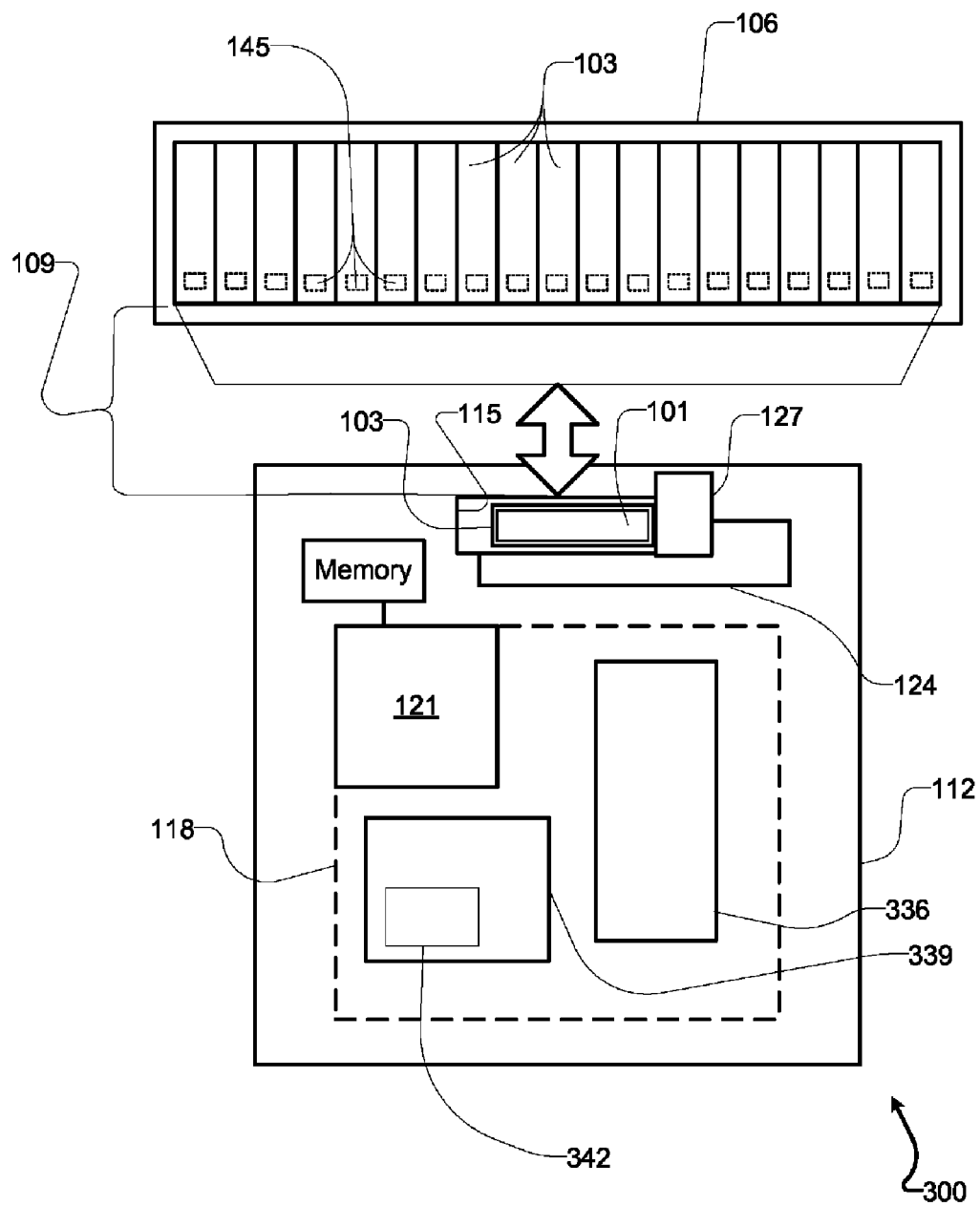
FIG. 3 is a schematic block diagram illustrating another embodiment of the system for protecting a medium that is loaded in a media drive.

FIG. 3 shows an embodiment of a system 300 for protecting a medium loaded in a media drive Like elements from the embodiment shown in FIG. 1 are labeled with the same numerals. The embodiment of FIG. 3 differs from the embodiment of FIG. 1 in that the embodiment of FIG. 3 is simplified to show fewer modules even though other modules may be present. The other modules may be separate from or integral with the electronic controller 118. An unthread module 336 may include structure and function similar to the unthread module 136 described above. A detector module 339 may include a timer and/or other detector mechanisms. As shown, the detector module may be separate from the unthread module. Alternatively, the detector module may form part of the unthread module. In any case, the detector module may include a signal generation module 342 for generating a signal when the detector module 339 detects a parameter at or above a predetermined threshold. Thus, the electronic controller may be notified and automatically initiate an unthread operation to protect the medium stored in the media drive 112.

It is to be understood that the embodiments described herein may be applied to any tape storage media, and potentially to other types of storage media. The embodiments may be applied to any tape storage drive including, but not limited to LTO and 3592 drives by IBM™, and any other similar drivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tape media drive for performing read/write operations on a tape medium, the tape media drive comprising:
 a processor;
 memory for buffer data storage;
 a user input module configured to receive, from a user, a user selection of two or more particular operating conditions among a plurality of operating conditions, the operating conditions comprising criteria for unthreading the tape medium and comprising a time lapsed after a read/write operation on the tape medium, characteristics of the tape medium, environmental effects on the tape medium, and media usage data of the tape medium;
 a signal generator module configured to detect one or more of the particular operating conditions of at least one of the tape media drive and the tape medium and to generate a signal if the one or more particular operating conditions have exceeded a predetermined threshold; and
 a tape unthread module communicable in signal receiving communication with the signal generator module, wherein the tape unthread module is configured to unthread the tape medium threaded on the tape media drive in response to a signal received from the signal generator module,
 wherein the tape unthread module is configured to initiate a save and a buffer data flush before unthreading the tape medium.

2. The tape media drive of claim 1, wherein the particular operating condition comprises the time lapsed after the read/write operation on the tape medium, and wherein the signal generator module generates a signal if the time lapsed after the read/write operation exceeds a predetermined timeout threshold.

3. The tape media drive of claim 1, further comprising a formatter module in the tape media drive for one or more of formatting data received from a host and storing the data in buffers before saving the data on the tape medium.

4. The tape media drive of claim 1, wherein the plurality of operating conditions comprises a number of times the tape medium has been retrieved from a media library.

5. A media drive mechanism, comprising:
 a reading head for reading storage media;
 a storage media loading and unloading mechanism for loading and unloading the storage media;
 a user input module with a user interface configured to enable a user to enter a user selection of two or more selected predetermined parameters among a plurality of predetermined parameters, the predetermined parameters comprising criteria for unloading the storage media and comprising a time lapsed after a read/write operation on the storage media, characteristics of the storage media, environmental effects on the storage media, and media usage data of the storage media;
 an electronic control module having machine readable code configured to detect a signal indicating fulfillment of one or more of the selected predetermined parameters entered by the user; and
 memory for buffer data storage,
 wherein the electronic control module is configured to initiate a save and a buffer data flush and unload storage media when the signal is detected.

6. The media drive mechanism of claim 5, wherein the plurality of predetermined parameters comprises a number of times the storage media has been retrieved from a media library.

7. A method of preserving storage media, the method comprising:
 enabling a user to select, through a user input module, two or more certain predetermined parameters among a plurality of predetermined parameters, the predetermined parameters comprising criteria for unloading the medium and comprising a lapse of a predetermined period of time after a read/write operation on the medium, characteristics of the medium, environmental effects on the medium, and media usage data of the medium;
 receiving a signal in the media drive indicating that the medium is loaded in the media drive and indicating fulfillment of one or more of the certain predetermined parameters entered by the user, the media drive comprising memory for buffer data storage;

initiating a save and a buffer data flush before unloading the medium; and actuating a medium unload operation from within the media drive to remove the medium from the media drive.

8. The method of claim 7, wherein the signal is generated from within the media drive.

9. The method of claim 7, wherein the signal is a representation of the lapse of a predetermined period of time.

10. The method of claim 7, wherein the signal is a representation of the certain predetermined media parameter, and the operation of actuating comprises unloading a storage medium when the certain predetermined media parameter indicates that a risk of damage to the storage medium exceeds a predetermined threshold.

11. The method of claim 7, wherein the signal is a representation of usage data, and the operation of actuating comprises unloading a storage medium when the usage data indicates that damage to the storage medium is likely to occur if the storage media is left in a loaded condition.

12. The method of claim 7, wherein the plurality of predetermined parameters comprises a number of times the storage media has been retrieved from a media library.

13. An article of manufacture comprising a computer program storage medium readable by a processor and embodying one or more instructions executable by a processor of a storage media drive to perform a method for automatically unloading a storage medium from a storage media drive, the method comprising:

receiving, from a user through a user input module, a user selection of two or more selected predetermined parameters among a plurality of predetermined parameters, the predetermined parameters comprising criteria for unloading the storage medium and comprising time lapsed after a read/write operation on the storage medium, characteristics of the storage medium, environmental effects on the storage medium, and media usage data of the storage medium;

detecting at least one of the certain predetermined parameters indicating that the unloading of the storage medium from a storage media drive is desirable, the storage media drive comprising memory for buffer data storage;

generating a request to unload the storage medium from the storage media drive;

initiating a save and a buffer data flush before unloading the storage medium; and unloading the storage medium under control of a storage media unload module in the storage media drive in response to detecting at least one of the certain predetermined parameters indicating that the unloading of the storage medium from the storage medium drive is desirable.

14. The article of manufacture of claim 13, further comprising undertaking one or more operations by a close out module.

15. The article of manufacture of claim 14, wherein undertaking one or more operations by the close out module comprises closing out active processing in the storage media drive.

16. The article of manufacture of claim 14, wherein undertaking one or more operations by the close out module comprises updating data bases used for backup and restore control.

17. The article of manufacture of claim 14, wherein undertaking one or more operations by the close out module comprises marking a location on the media at which a head of the driver last operated on the media.

18. The article of manufacture of claim 13, further comprising formatting data received from a host and storing the data in buffers before saving the data on the media.

19. The article of manufacture of claim 13, wherein the plurality of predetermined parameters comprises a number of times the storage media has been retrieved from a media library.

* * * * *